May 21, 1935.   A. C. PETERSON   2,002,210
DRIVE AND SUSPENSION MEANS
Original Filed May 1, 1929
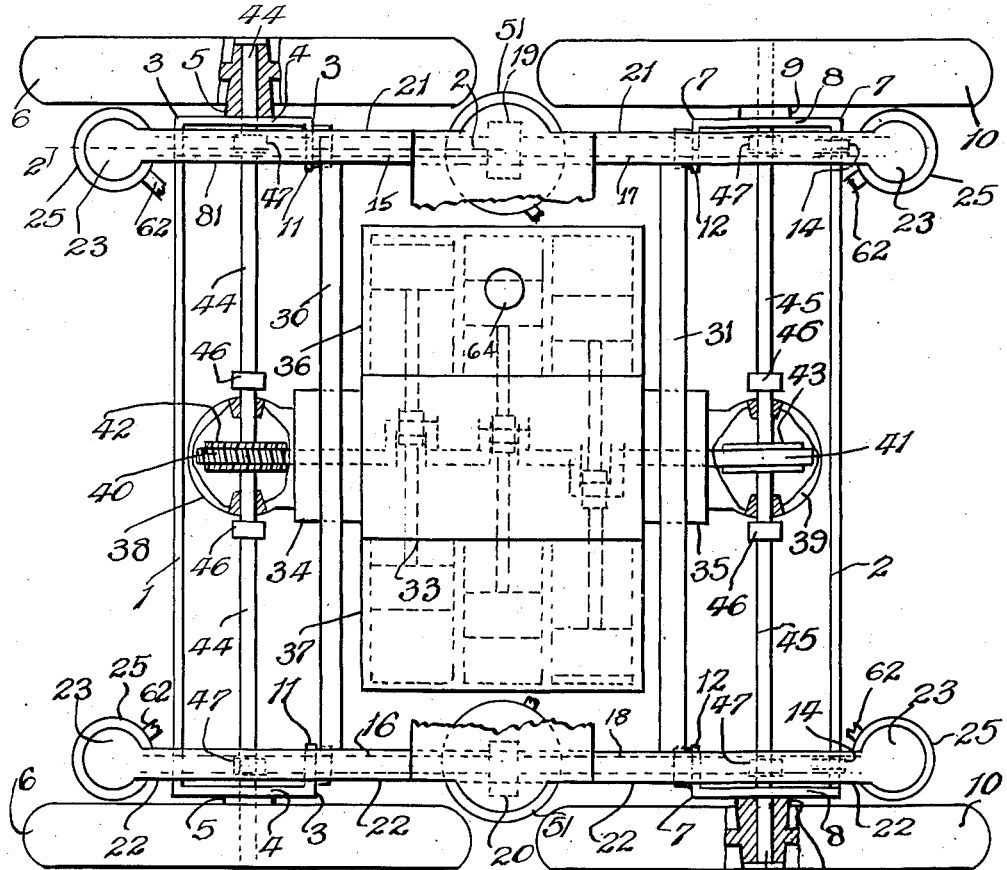
Fig.1.
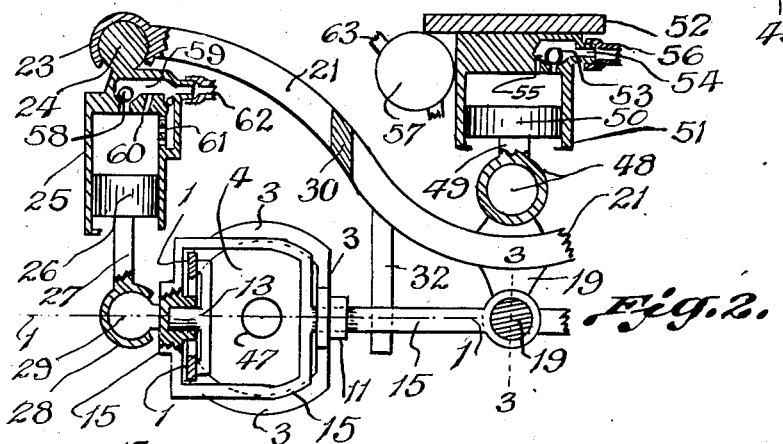
Fig.2.
Fig.3.
Inventor
Adolphe Peterson Patented May 21, 1935

2,002,210

UNITED STATES PATENT OFFICE 2,002,210

DRIVE AND SUSPENSION MEANS

Adolphe C. Peterson, Minneapolis, Minn.

Application May 1, 1929, Serial No. 359,679
Renewed October 17, 1934

6 Claims. (Cl. 180—22)

My invention relates to drive and suspension means.

The principal objects of my invention are to provide a suspension means for automotive vehicles of the road or rail type and to provide in connection therewith a particular form of drive means which shall form an improved combination of drive and suspension means. A particular object is to provide a suspension means which is particularly adapted to automobiles and busses and also is adapted to rail cars and has particular smoothness in its suspension and is therefore an improved form of suspension means. A particular object is to provide a form of drive means which is particularly adapted to driving busses and also to the driving of rail cars where there is particularly required a form of drive means which will not occupy much space and which also has the advantage that the drive means may be removed quickly and a substitute driving means installed. A particular object of the invention is to provide a form of driving truck for the driving and suspension of busses of the six or eight wheeled type and which is also adapted to the suspension and driving of rail cars where one or two trucks of four or more wheels is required.

The particular devices and combinations of devices comprising my invention are as hereinafter described and as defined in the claims. In the accompanying drawing which illustrates my invention like characters refer to like parts throughout the several views.

Referring to the drawing:

Figure 1 is a plan view of a truck embodying my invention this truck being shown attached to one member of the frame of an automobile buss or rail car, some parts being broken away some being in section on the line 1—1 of Fig. 2.

Figure 2 is a vertical section along line 2—2 in Figure 1, through the principal members of the suspension means at one corner of the truck and one side central part.

Figure 3 is a detail view showing a vertical section on the dotted line 3—3 in Fig. 2 on part 19 in Figure 2.

Referring again to the drawing, the numeral 1 indicates an axle at one end of the truck and the numeral 2 indicates an axle at the other end of the truck. The axles 1 and 2 are as shown each of them offset forwardly in the case of one and rearwardly in the case of the other from the axis line of the two wheels which are supported upon the axle. The axle 1 has end parts 3 which are bent and have formed therewith the spindle supporting disks 4 which have formed therewith tubes 5 which constitute the wheel supporting spindle. These spindles 5 support upon them wheels 6 which may be the usual type of buss pneumatic tired wheel or may be the railroad type of flanged car wheel. The buss type of wheel is illustrated. The axle 2 has end parts 7 which are bent and have formed therewith the spindle supporting disks 8 and have formed therewith tubes 9 which constitute the wheel supporting spindles. These spindles 9 support upon them wheels 10, which may be of the same type as those supported upon the spindles 5. The axles 1 and 2 are preferably each made as shown of two integrally wrought or forged or cast steel flat bars, the bars having at their ends welded to them or formed integrally with them the end parts 3 and 7 respectively.

The supporting disks 4 and 8 each have constructed integrally therewith inwardly projecting radius rod bearings 11 and 12 respectively. Each axle 1 and 2 have fixed thereto or forged therewith in line transversely across the axles with the radius rod bearings 11 or 12, counterpart radius rod bearings 13 and 14 respectively. The radius rod bearings described are thus located in pairs, one pair near each wheel supporting disk, and there are thus four pairs of these radius rod bearings. The pairs at the opposite ends of axle 1 have related to them radius rods 15, 16, each of which is trunnioned in its pair of bearings so that the axle end may have oscillation on the radius rod about an axis which is transverse of the axle near the wheel supporting disk and so that the axle 1 may move upward or downward at either end of it on the radius rod as a bearing but the axle 1 may not turn about its own axis but is prevented therefrom by its support by the radius rod. Similarly radius rods 17, 18 are trunnioned in the radius rod bearings related to the axle 2 and they prevent the axle 2 from turning about its own axis but permits either end of axle 2 to rise or fall pivoting upon the radius rod as a bearing.

The radius rods 15, 16 are at their inner ends supported and trunnioned upon bearings 19, 20 fixed upon the truck end frames 21, 22. The radius rods 17, 18 are at their inner ends supported and trunnioned upon the same bearings 19, 20 the inner ends of one of the pairs of radius rods being forked for that purpose. The bearings 19, 20 are upon an horizontal axis and permit the radius rods to have oscillation in the vertical plane. The truck end frames 21, 22 are curved as shown in the vertical planes at the sides of the truck and the extreme end of each is raised above the axle end related to it. These ends of the truck end frames 21, 22 are located at or near the four corners of the truck and they have at these four corners sockets 23, with which are related balls 24.

The four balls 24 with their sockets 23 constitute ball and socket joints and constitute a suspension of the four corners or ends of the truck end frames upon four air cylinders 25 each of which is attached to its related ball 24. The four air cylinders 25 are rather large and have reciprocable within them four pistons 26, these having related four rods 27. The rods 27 are short and have attached thereto at their lower ends four sockets 28 related to four balls 29. The balls 29 are attached to or formed integrally with the extreme outer ends of the radius rods. Thus each radius rod has at its outer end or free end a ball and socket joint connecting it with a piston 26 reciprocable in an air cylinder 25 the upper end of which is connected by a ball and socket joint with one corner of the truck frame. The truck frame is formed by the truck end frames 21, 22 and two transverse or cross members 30, 31, near the forward and rear end of the truck respectively. The truck end frames have depending bars 32 which form slides or guides against which the radius rods may oscillate in the vertical plane, these guides preventing lateral movement relatively.

The cross members of the frame form a support for an engine crank case 33 and attached clutch and/or clutch gear boxes 34, 35, the cross members being firmly attached to the clutch gear boxes 34, 35, so that the crank case 33 and clutch gear boxes are thus held relatively rigidly in a horizontal plane and in substantially the same plane as the cross members 30, 31. The crank case and clutch gear boxes are so supported that they extend with their axes from front to rear substantially at the center relative to the track of the truck. The crank case has attached to its sides in the horizontal plane cylinder blocks 36, 37 one at each side of the axis and crank case, and each cylinder block has preferably three cylinders formed in it, these cylinders being diagrammatically illustrated by the dotted lines.

The crank case 33 and clutch gear boxes 34, 35 have related to them and attached rigidly thereto at the forward and rear ends respectively, two differential cases 38, 39 which have within them worms 40, 41 driving wheels 42, 43 the worms being preferably on the upper sides of the wheels. The supporting of the worms and wheels is not particularly shown, nor is the differential in connection shown it being contemplated that any form may be used. The construction within the crank case and clutch gear boxes and differential cases is merely diagrammatically shown it being contemplated that any form may be used and that this form is not material, the crank case clutch gear boxes and two differential cases however constituting one rigid assembly supporting these engine and clutch and gear parts within. From each differential case Cardan shafts extend laterally to the sides of the truck just within the axle related, Cardan shafts at one end being denoted 44 and Cardan shafts at the other end being denoted 45. The Cardan shafts 44 are in the axis line of their related pair of wheels 6 and the Cardan shafts 45 are in the axis line of their related pair of wheels 10. The Cardan shafts have universal joints 46 near the differential cases and universal joints 47 near their outer ends, that is near the wheels 6 or 10. The drive of the wheels by the Cardan shafts is not particularly shown it being contemplated that this is of the usual form and this being shown diagrammatically only.

The truck end frames 21, 22 have at their central portions, ball and socket joints 48, there being two of these joints one on each side of the truck frame at the central portion of the truck end frame on that side of the truck. These ball and socket joints by means of rods 49 are attached to or connected with pistons 50 which are reciprocable vertically in cylinders 51 of which there are two one at each side of the truck. The cylinders 51 have at their upper ends firm or rigid support on the under side of chassis frame member 52 this chassis frame member diagrammatically illustrating a buss frame or body or a rail car body or frame to which the truck is attached as a support for one end thereof. The buss or rail car will have a similar truck at its other end or merely a suspension truck or wheels at its other end, this not being shown however.

The two cylinders 51 have in their upper ends ports controlled by non-return valves 53 delivering from the cylinder into conduits 54, and small auxiliary ports 55 likewise deliver into the conduits 54. The conduits 54 are by flexible conduits 56 connected with an air pressure reservoir 57. The cylinders 25 at the corners of the truck each have ports delivering therefrom controlled by non-return valves 58, the delivery being to conduits 59 in the upper ends of the cylinders. Each of these four cylinders 25 has also a small port 60 delivering to the conduit 59 and has also ports 61 in the sides of the cylinders delivering to conduits 59. The conduits 59 deliver to and receive air from flexible conduits 62 which are also connected to the air pressure reservoir 57. Thus each cylinder 25 and each of the two cylinders 51 may deliver air quickly to their respective conduits and thus to reservoir 57 through the non-return controlled ports, but may receive air under pressure at a slower pace by means of the small continuously open ports described. Also the four cylinders 25 may have additional delivery through the ports 61 in their sides so that delivery from cylinders 25 becomes gradually less in volume or rate as the pistons in these cylinders 25 rise and cover the ports in the sides of the cylinders 25. All the suspension cylinders may at any time receive air from the reservoir through the small ports. The pressure in the reservoir is kept up by means of an air pressure supply conduit 63 which receives air under a constant pressure from any source of supply upon the chassis or body, this not being shown. It is contemplated that this air supply may be variable at the will of the operator to provide different carrying capacity depending upon the loading. The cylinders 51 and 25 should be so proportioned that the weight will be properly supported. Either the cylinders 25 or the cylinders 51 may be so proportioned that any road shock will be first taken by one of them, preferably however the cylinders 25 are so proportioned that they will have slightly less carrying capacity than the cylinders 51 and therefore they will first yield to the shock and take the minor road shocks, or unevenness.

The engine cylinders receive an operating fluid from a conduit 64, it being contemplated that the engine may be operated by steam or air pressure or by air and fuel as an ordinary internal combustion engine or by combined air pressure and internal combustion this being upon the system which is determined to be most applicable. Clutch and gears in the clutch gear boxes may or may not be provided in accordance with the system used. The engine crank case has its crank shaft trunnioned on an axis therein from front to rear of the truck, this not being illustrated, and drives through the gears in the differential cases the Cardan shafts which are universally jointed and these drive the wheels 6 and 10, the Cardan shafts permitting the wheels 6 and 10 to rise or lower with their axles 1 or 2 relative to the engine and differential case assembly, the latter being rigidly mounted with the truck frame comprised of the truck end frames and their cross members. The cylinders 25 take the lighter shocks or upward movement of the axles and the cylinders 51 take some of the shock between the truck frame and the chassis or body members.

While I have shown particular devices and combinations of devices in the illustration of my invention I contemplate that other detailed devices and combinations of devices may be used in the realization thereof without departing from the spirit and scope of the invention.

What I claim is:

1. In a drive means, a motor having cylinders placed in a horizontal plane and having rigid suspension in a frame and having geared drive means at each end of the motor, a pair of wheels at each end of the frame yieldably mounted relative thereto, a pair of Cardan shafts at one end of the frame having driving connection between one pair of wheels and one geared drive means, and a pair of Cardan shafts at the other end of the frame having driving connection with the other pair of wheels.

2. In a drive means, a pair of axles, bearing wheels at their ends, a motor having cylinders in a horizontal plane suspended between the axles and having drive means at each end, a pair of Cardan shafts in the axis line of one pair of wheels and having connection between one drive means and the pair of wheels, and a pair of Cardan shafts in the axis line of the other pair of wheels and having connection between the other drive means and the pair of wheels.

3. A driving truck comprising a pair of axles each having wheels at each end, a driving motor having a driving shaft mounted between the axles and at right angles thereto and having cylinders placed in a horizontal plane on each side of the driving shaft, yieldable suspension between the motor and the axles, Cardan shafts at one end of the motor forming driving connection between the driving shaft and the wheels of the related axle, and Cardan shafts at the other end of the motor forming driving connection between the driving shaft and the wheels of the related axle at that end.

4. In a drive means, a motor having a crank shaft mounted in a horizontal plane and longitudinally in a frame and having geared drive means at each end of the motor, a pair of wheels at each end of the frame yieldably mounted relative thereto, a pair of Cardan shafts at one end of the frame having driving connection between one pair of wheels and one geared drive means, and a pair of Cardan shafts at the other end of the frame having driving connection with the other pair of wheels.

5. In a drive means, a pair of axles bearing wheels mounted at their ends, a motor having a crank shaft in a horizontal plane and suspended longitudinally between the axles and having drive means at each end, a pair of Cardan shafts in the axis line of one pair of wheels and having connection between one drive means and the pair of wheels, and a pair of Cardan shafts in the axis line of the other pair of wheels and having connection between the other drive means and the pair of wheels.

6. A driving truck comprising a pair of axles each having wheels at each end, a driving motor having a driving shaft mounted between the axles and at right angles thereto and having cylinders located with their axes at right angles to the driving shaft, yieldable suspension between the motor and the axles, Cardan shafts at one end of the motor forming driving connection between the driving shaft and the wheels of the related axle, and Cardan shafts at the other end of the motor forming driving connection between the driving shaft and the wheels of the related axle at that end.

ADOLPHE C. PETERSON.